United States Patent [19]

Deleris

[11] 4,367,710
[45] Jan. 11, 1983

[54] SPARK COIL CONTROL DEVICE FOR INTERNAL COMBUSTION ENGINE EQUIPPED WITH ELECTRONIC IGNITION ADVANCE

[75] Inventor: Robert Deleris, Bailly, France

[73] Assignee: Regie Nationale des Usines Renault, Boulogne-Billancourt, France

[21] Appl. No.: 214,973

[22] Filed: Dec. 10, 1980

[30] Foreign Application Priority Data

Jan. 29, 1980 [FR] France ................. 80 01834

[51] Int. Cl.³ .............................................. F02P 5/08
[52] U.S. Cl. ................................. 123/416; 123/609
[58] Field of Search ............... 123/416, 609, 611, 417

[56] References Cited

U.S. PATENT DOCUMENTS

| | | | |
|---|---|---|---|
| 4,081,995 | 4/1978 | Griffith et al. | 123/416 |
| 4,104,570 | 8/1978 | Hamby et al. | 318/318 |
| 4,162,666 | 7/1979 | Maioglio | 123/416 |
| 4,169,438 | 10/1979 | Iwase et al. | 123/416 |
| 4,198,936 | 4/1980 | Pagel et al. | 123/609 |

FOREIGN PATENT DOCUMENTS 2230992 12/1974 France .
2312882 12/1976 France .

*Primary Examiner*—Charles J. Myhre
*Assistant Examiner*—Andrew M. Dolinar
*Attorney, Agent, or Firm*—Oblon, Fisher, Spivak, McClelland & Maier

[57] ABSTRACT

A spark coil control device for an internal combustion engine with several cylinders, including a target with a given number of protrusions distributed regularly around its periphery which is rotating with the crankshaft, at least one fixed-position primary element associated with the target, an ignition coil, a rotating spark distributor for inducing explosions within the various cylinders of the engine is succession by the intermediary of the associated sparkplugs, a stage for processing of the data signal retrieved by the position primary element which inter alia provides a synchronization signal and a speed of rotation signal, an electronic ignition advance calculator which at a first output provides a gross numerical value for ignition advance angle and, at a second output, a gross numerical value for the angle of conduction of the coil, and a power stage for commanding the ignition coil. The device further includes a command signal generator connected between the two outputs of the electronic advance calculator and the power stage commanding the ignition coil, wherein the processing stage for the primary element data signal engenders a third signal whose frequency is the product of the speed of rotation of the multiplied engine by the number of protrusions on the periphery of the target, and wherein the command signal generator stage processes the angle for the initial conduction of the coil and the angle of ignition advance based on the three types of signals provided by the stage for processing the primary element data signal.

5 Claims, 3 Drawing Figures

SPARK COIL CONTROL DEVICE FOR INTERNAL COMBUSTION ENGINE EQUIPPED WITH ELECTRONIC IGNITION ADVANCE

BACKGROUND OF THE INVENTION

1. Field of the Invention

This invention relates to a spark coil control device for an internal combustion engine equipped with electronic ignition advance.

2. Description of the Prior Art

In any inductive coil system, spark generation is provided by breaking a high current in the primary of a high voltage coil, thereby inducing a surge of current to the secondary tied into the spark plugs. The energy stored in a coil has the form $\frac{1}{2} LI^2$ where L is the coefficient of self-induction and $I^2$ is the square of the intensity of the current circulating in the primary immediately before being open circuited. In conventional spark coils where the rupture is provided by contact points, the cyclical relationship of the contact point closure is maintained at a constant 66% of the period, and spark generation under all circumstances results from a compromise between a coil being heated by the Joule effect when the motor is at idle and a sufficient quantity of stored energy to provide spark at higher rpms.

In an electronic ignition system for an internal combustion engine with programmed spark cartography, it is advisable to set aside space in the memory to make it possible to engender an angle for initial coil conduction which varies in accordance with the speed of rotation of the motor, thereby eliminating that compromise. It is also possible to use the value for the speed of rotation to take into account the lower battery power during the starting phase.

In most known ignition systems involving an electronic calculator, a counter under a load which is the 180° complement of the angle of ignition advance is decremented for each degree of rotation of the crankshaft and controls the zero resetting of a bridge which commands the circulation of electrical current in the primary of the coil. The high logical state of the bridge is commanded by the coincidence output from a logic comparator which is connected, on the one hand, to the outputs of the counter and, on the other hand, to the memory providing the value of the angle for initiating coil conduction. The drawback of such a system is that it is incapable of inducing coil conduction when the value of the conduction angle is greater than the 180° complement to the angle of advance.

The major drawback stems from the quality of the decrementaiton signal. Indeed, it is difficult to devise a mechanical method for large-scale production of targets and of primary elements providing resolution of a crankshaft degree. Targets are generally manufactured with a number of teeth of less than 50, and interpolation is used to initiate 360 impulses for each revolution of the crankshaft. The interpolation systems have sufficient precision when the motor is operating at a steady speed but when it is operating at variable speeds, in particular when it is being started in intense cold, the number of impulses restored per half revolution generally differs substantially from 180, which induces an error in the value of the spark advance angle equal to the differences between the value restored over a half revolution and the theoretical number. One solution consists in bringing about the release of a spark when a reference mark connected with the flywheel passes by a primary element on the crankshaft of the flywheel so long as the speed of rotation of the motor is below a certain threshold, but this solution does not permit taking maximum advantage of the flexibility offered by the electronic generation of a spark advance law.

SUMMARY OF THE INVENTION

Accordingly, one object of this invention is to provide a novel spark coil control device for an internal combustion engine equipped with electronic ignition advance which makes it possible to avoid the above-noted drawbacks.

For a more complete understanding, the description of a spark coil control device in accordance with the present invention makes reference to an electronic spark advance calculator or at least to a system making it possible to transform the spark advance value, the result of calculation, into an instant of spark, and to the system, making it possible to store in the coil the energy required by the sparkplug for engendering a spark. For such additional information, reference is made to the following French patent applications filed by the Applicant:

Patent application No. 75/30902 filed on Oct. 9, 1975, and its certificate of addition No. 76/11524 filed on Apr. 20. 1976, for an "Electronic Ignition Control Procedure and Device for an Internal Combustion Engine";

Patent application No. 78/00381 filed on Jan. 9, 1978 for a "Safety Device Associated with a Coil Conduction Time Command";

Patent application No. 79/00386 filed on Jan. 9, 1979 for a "Procedure and Apparatus for Reference to the Angular Position of an Element Placed in Rotary Movement" corresponding to U.S. Pat. No. 4,321,580.

Corresponding United States patents and/or patent Applications filed in the United States claiming priority based on the above noted French Applications 75/3090-2 and its certificate of addition 76/11524; 78/30902; and 79/00386 are respectively, U.S. Pat. Nos. 4,127,091; 4,239,024; and U.S. Application Ser. No. 110,748 filed Jan. 9, 1980, the disclosure of which is hereby incorporated by reference herein.

However, the principle of the invention is applicable to all electronic ignition advance calculators by making technological adaptations within the scope of the technician.

The present invention concerns a spark coil control device for an internal combustion engine with several cylinders, of the type including a target provided with a given number of protrusions distributed regularly around its periphery which is rotating with the crankshaft, and at least one fixed-position primary element, associated with the target, an ignition coil, and a rotating spark distributor intended to induce explosions within the various cylinders of the engine in succession by the intermediary of the associated sparkplugs, in which there is further provided a stage for treatment of the data signal retrieved by the position primary element which inter alia provides a synchronization signal and a speed of rotation signal; an electronic ignition advance calculator having a first output which provides a gross numerical value for ignition advance angle and a second output in the form of a gross numerical value for the angle of conduction of the coil; and a power stage for commanding the ignition coil. The device advantageously further includes a command signal generator connected between the two outputs of the electronic advance calculator and the power stage commanding the ignition coil, wherein the treatment stage for the primary element signal engenders a third signal whose frequency is the product of the speed of rotation of the engine multiplied by the number of protrusions on the periphery of the target and wherein the command signal generator stage treats the angle for initial conduction of the coil and the angle of ignition advance by means of the three types of signals provided by the unit for processing the primary element signal. In accordance with a primary manufacturing characteristic, the command signal generator stage includes: a first counter and a second counter which, on the one hand, have their inputs connected to the output of the calculator providing the gross numerical value for ignition advance angle, the first counter being connected by its clock input to the stage for treatment of the signal retrieved by the position primary element thereby to receive from it the third signal (HCA), whereas the second counter is connected by its clock input to the stage for treatment of the signal retrieved by the position primary element so as to receive from it the speed of rotation signal, while there is an adding stage connected by a first series of inputs to the outputs of the first counter and by a second series of inputs to the output of the calculator providing the gross numerical value for the conduction angle.

According to a second manufacturing characteristic, the output of the adding stage if connected to the input of the power stage of the spark coil through a first logic AND gate which is connected by means of a second input to the stage for assessing the maximum value for the two counters taken together and by a third input to the combined outputs of the two counters through the two logic NAND gates and one logic OR gate.

BRIEF DESCRIPTION OF THE DRAWINGS

A more complete apprecation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
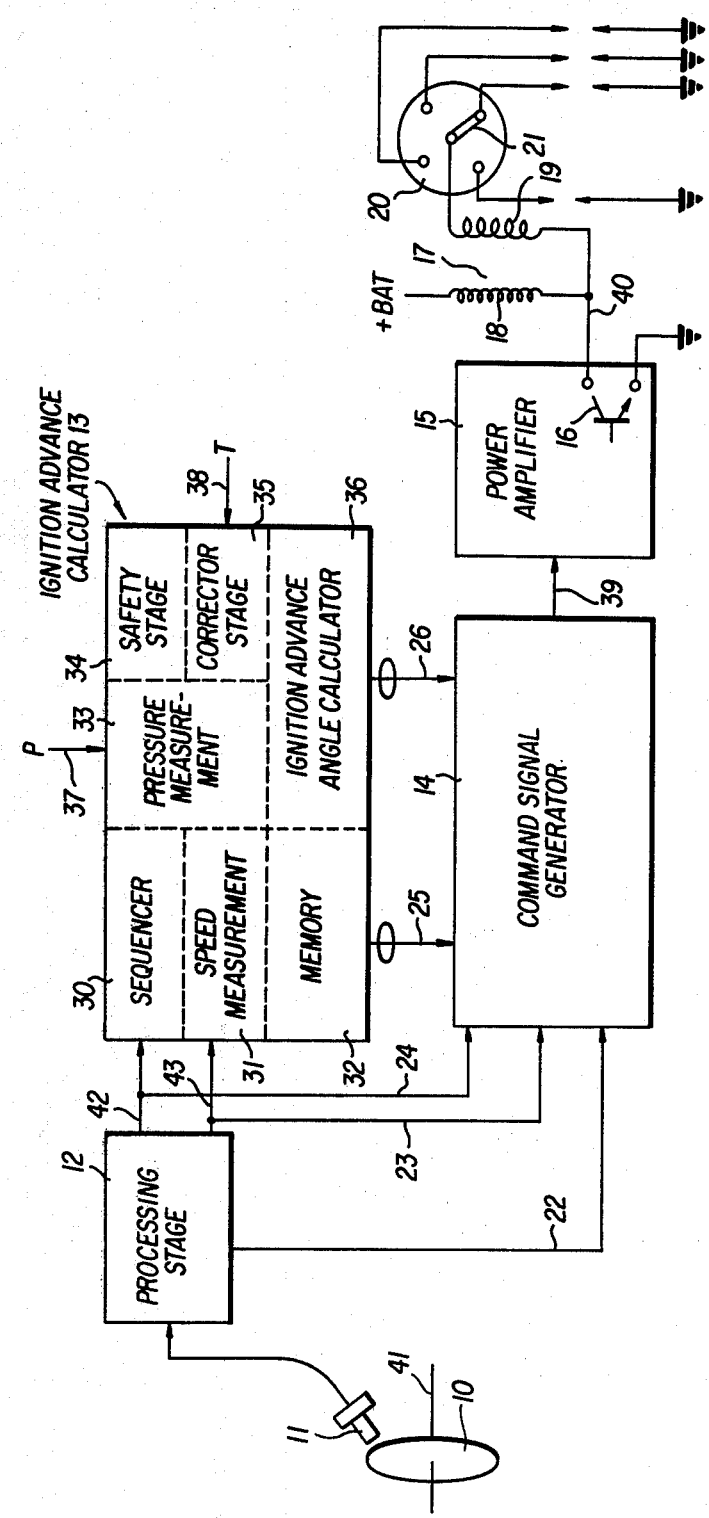
FIG. 1 is a schematic block diagram of one example of an ignition advance calculator which incorporates the device according to the invention.

Referring now to the drawings, wherein like reference numerals designate identical or corresponding parts throughout the several views, and more particularly to FIG. 1 thereof, which schematically represents in block diagram format one example of an ignition advance calculator incorporating the device according to the invention, an ignition advance calculator 13 receives a synchronization signal Sy at one input 42 and a speed of rotation signal V at stage 12 for the signal derived by a position primary element 11 detecting the passage of the teeth found on the periphery of a target 10 attached to the crankshaft 41 and a revolving synchronously with it. The primary element 11 provides a permanent electrical image of the periphery of the target. This combination has been described in French patent application 79/00386 mentioned above. The key parts of the calculator 13 are as follows: a sequencer 30, a stage for measurement of speed of rotation 31, a memory 32, a stage for measurement of pressure 33 connected with a primary element for external pressure by an input conductor 37, a safety stage 34 to protect against breakdown of the calculator 13, a correction stage 35 connected in particular with a primary element for outside temperature by an input conductor 38 and a stage 36 for actual calculation of the ignition advance angle. This calculator has been described in French patent application Nos. 75/30902, 76/11524 and 78/00381 mentioned above. The calculator 13 provides at its respective outputs 25 and 26 two digital numbers which correspond, respectively, to the angle of initial conduction of the coil 17 expressed as a number of teeth on the target 10 at its output 25 and to the gross ignition advance angle expressed as a number of teeth on the target 10 and a number of subdivisions between two teeth on the target 10 at its output 26. These two digital numbers, through conductors 25 and 26, reach inputs on a unit 14 for generation of the command signal to the coil 17 which is the subject of the present invention.

The command signal generation unit 14 processes two digital numbers 25 and 26 received based on three types of signals provided by the unit for processing the primary element signal 12: the synchronizaton signal Sy received at conductor 24 from conductor 42; the speed of rotation signal V proportional to the speed of rotation of the engine received at conductor 23 and whose value will be specified below. The first two signals have already been referenced in the above-mentioned patent applications. The generation unit 14 for the coil command signal provides at its output 39 a low power signal which is transmitted to a power amplifier stage 15 whose output 40 is connected to the ignition coil 17 which has a primary winding 18 and a secondary winding 19 connected at one end to the central point of a distributor 20 around which revolves the distributor rotor 21 which successively places in contact during its rotation the secondary 19 of the ignition coil 17 with the sparkplugs of the different cylinders of the engine, thereby inducing the explosion and combustion of the mixture contained in the cylinders.

Figure 2:
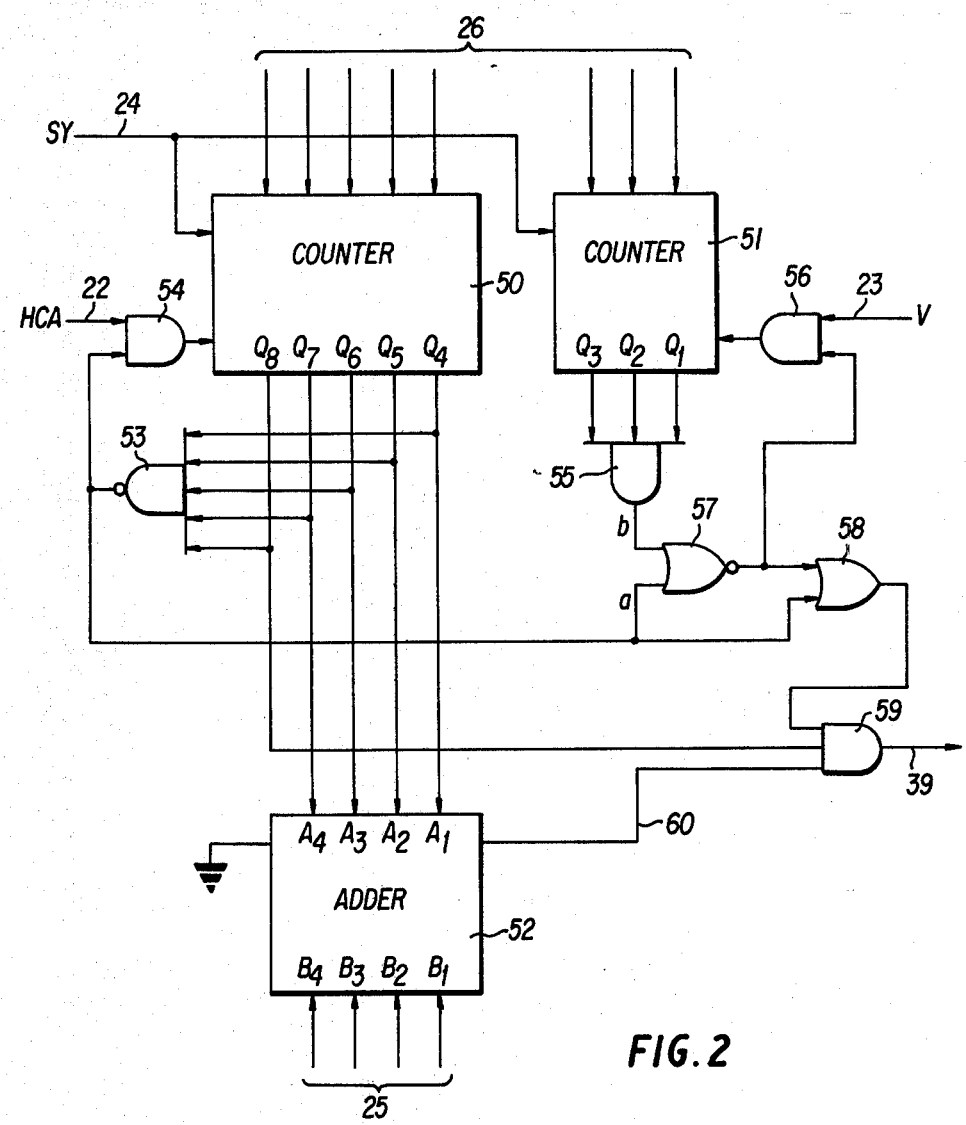
FIG. 2 is a circuit diagram of one implementation of the block for generating the command signal for the ignition coil in accordance with FIG. 1.

FIG. 2 is a detailed illustration of one implementation of the generation unit 14 for the ignition coil 17 command signal. This generation unit 14 includes a first counter 50 of five binary figures, a second counter 51 of three binary figures, and an adder 52 for four binary figures. The two counters 50 and 51 are connected by their inputs to the output 26 of the calculator 13 which provides a binary number corresponding to the gross ignition advance angle with the five most significant bits applied to the counter 50 and the three least significant bits applied to the counter 51. These two counters 50 and 51 are also connected by their charging or loading input to the conductor 24 so as to receive the synchronization signals Sy. With the exception of output $Q_8$ of the greatest weight, the four other outputs $Q_7$, $Q_6$, $Q_5$ and $Q_4$ of the counter 50 are connected to a first series of inputs $A_4$, $A_3$, $A_2$ and $A_1$ of the adder 52 for four binary figures which is connected by a second series of inputs $B_4$, $B_3$, $B_2$ and $B_1$ to the output 25 of the calculator 13 providing a binary number corresponding to the angle of initial conduction of the coil 17. The output $Q_8$ of highest weight of the counter 50 is connected to an input of a first logic AND gate 59 whose output 39 is the same as the output for the generation stage 14 for the signal commanding the coil 17 through the power amplifier stage 15. The five outputs $Q_4$ to $Q_8$ of the counter 50 are, moreover, connected by inputs to a logic NAND gate 53 whose output is connected, on the one hand, to a first input of a logic OR gate 58 and, on the other hand, to a first input of a logic AND gate 54 whose second input is connected to the conductor 22 carrying the HCA signal from the stage for treatment of the primary element signal 12 and whose output is connected to the clock input of the counter 50. The three outputs $Q_1$ to $Q_3$ of the second counter 51 are connected as inputs to a logic AND gate 55 whose output b is connected to a first input of a logic NOR gate 57 whose output is connected, on the one hand, as the second input to a logic OR gate 58 mentioned above and, on the other hand, as the first input to a logic AND gate 56 whose output is connected to the clock input of the second counter 51. The second input of the logic AND gate 56 is connected to the conductor 23 from the processing unit 12 for the signal from the primary element receiving the signal for speed of rotation V. The output of the logic OR gate 58 is connected as the second input to logic AND gate 59 whose third input is connected to the output 60 of the adder 52. Moreover, the second input a of the logic NOR gate 57 is also connected to the output of the logic NAND gate 53.

Figure 3:
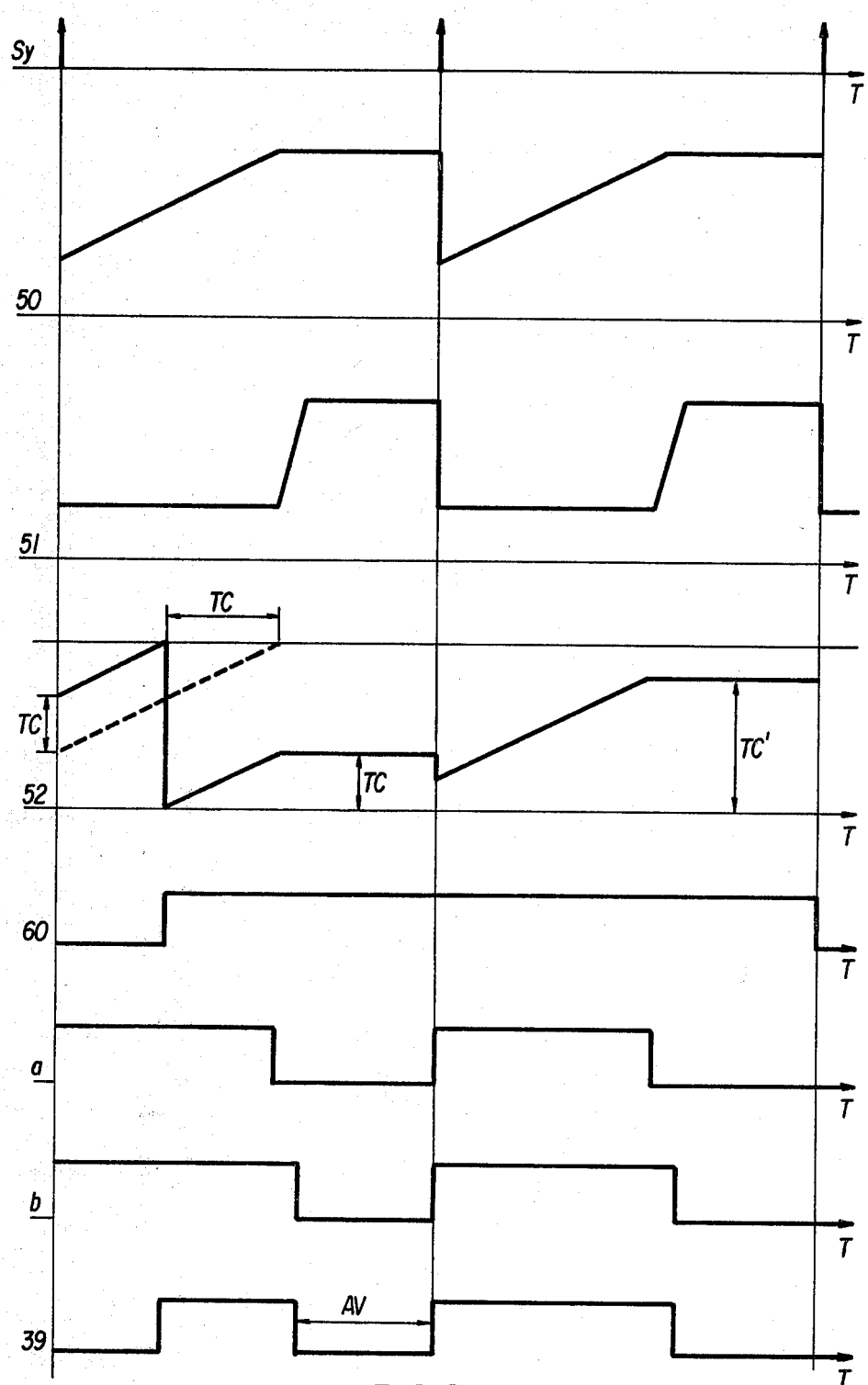
FIG. 3 is a chronogram of the signals present at the key points of the generation block of FIG. 2.

Before describing a specific case of functioning supported by figures we shall briefly examine the various curves illustrated in FIG. 3 and which represent the signals appearing at the most important points of FIG. 2 as a function of time. Line 1 represents the synchronization impulses Sy transmitted by the conductor 24 to the charging inputs of the two counters 50 and 51, for which we have represented here the state resulting from the counting of the impulses transmitted by the conductor 26 from the ignition advance calculator 13 as a function of time. The fourth line represents, as a function of time, the state of counting within the adder 52 which results from adding quantities appearing at the outputs $Q_4$ to $Q_7$ of the counter 50 and the binary number provided by the calculator 13 at its output 25, a binary number corresponding to the angle of initial conduction TC of the high tension coil 17. The ordinates and abscissas show the share attributable to the counter 50 and that attributable to the angle of initial conduction TC. From this, on line five is deduced the status at the output 60 which includes, between two successive synchronization impulses Sy, a first time interval when the conductor 60 is in a low state and a second time interval when the conductor 60 is in a high state. The two following lines, six and seven respectively, show analagously the status of conductors a and b connected to the respective inputs of logic NAND gate 57, the status of conductor a corresponding to the inverse of the output of all the conductors of the counter 50 while the status of conductor b corresponds to the inverse of the output of all the conductors of the counter 51.

Finally, the last line of FIG. 3 represents the signal corresponding to the status of conductor 39 at the output of the logic AND gate 59 which recapitulates the status of the three input conductors. In it can be seen, between two successive synchronization impulses Sy, a rectangular impulse with delimits between its ascending and descending sides the corrected conduction time allotted to the ignition coil 17, and between the descending side of said rectangular impulse and the next synchronization impulse Sy, the corrected ignition advance AV.

In fact, as the conduction time programming pace is different from the pace of incrementation of the counter, the corrected conduction time will always be slightly greater than the conduction time programmed in the memory. The value of this excess expressed in numbers of teeth will always be less than one.

For the sake of completeness, nextly is provided a precise correction example with figures intended primarily for the technician. This example in no way reduces the scope of the present invention. We assume that the target 10 is manufactured with 44 teeth and that the treatment unit 12 for the primary element signal divides the interval between successive teeth in eight parts. The two types of HCA signals are received at the conductor 22 at the frequency of 44 times the speed of rotation of the engine and signal V is received at conductors 43 and 23 at a frequency 352 times the speed of rotation of the motor, i.e., approximately one impulse is generated per degree of rotation of the crankshaft; but this error is known and systematic and may be taken into account when the values for the parameters needed to calculate the programmed advance law are placed in the memory 32. The blocked status of the counters 50 and 51 occurs when the value "one" appears at all the outputs $Q_1$ to $Q_8$, which in numerical terms corresponds to 225; as only 176 impulses can be induced for each half rotation of the target 10, it is therefore advisable to preload the set of counters 50 and 51 with the value $255 - 176 = 79$, so as to have a nil advance angle. If a number av is added to this advance value, the set of counters 50 and 51 arrives at the status 255 after $176 - av$ impulses. There is thus an ignition advance of av degrees. To avoid errors attributable to the interpolation process used, the counter 50 is incremented every eight V impulses, i.e., at every tooth of the target, and hence without error, by the action of the HCA signal representing the teeth of the target 10 on the clock input of the counter 50 with the weight eight, and, when the heavy weight part of the counter 50 reaches its maximum, the low weight part 51 is incremented by acting on the clock input of the counter 51 with the weight 1 by means of a degree V signal on the conductor 23.

Thus, to induce ten degrees' ignition advance, the counter 50,51 must be preset at $79 + 10 = 89$, or $11 \times 8 + 1$. To arrive at the overall 255 status for the two counters, it is therefore necessary to count $31 - 11 = 20$ teeth and $7 - 1 = 6$ impulses in which 31 and 7 correspond to the maximum status of counters 50 and 51 respectively, which corresponds to $176 - (20 \times 8 + 6) = 10$ degrees of ignition advance.

How to obtain the position of each spark has been described. To obtain a spark, current must be circulated in the coil 17. The moment of breakage must be anticipated and the current established TC teeth before breakage. It suffices to add the quantity TC to the value in counter 50, 51 to obtain the state of coil 17 saturation TC teeth before the spark. In the case of a sizable advance at high operating speeds, the value of the conduction time TC may be greater than the remaining number of teeth to be counted. In this case the coil 17 is brought into conduction immediately and the value of the real conduction time is equal to the number of teeth remaining to be counted. This results in a weaker spark than with a system with discounter and comparator, when there would be no spark at all. In the present case, the weak signal is amplified by the power transistor 16 at the power stage output 15.

The righthand part of FIG. 3 represents this type of functioning where the quantity TC is greater than the number of teeth to be counted for the counter 50 to reach saturation.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A spark coil control device for an internal combustion engine having a crankshaft and plural cylinders, of the type provided with a target having associated therewith a number of protrusions distributed around its periphery which is rotating with the crankshaft, and at least one fixed position primary element associated with said target for generating a data signal, an ignition coil, and a spark distributor intended to induce explosions within the various cylinders of the engine in succession by the intermediary of respective sparkplugs, comprising:
    a stage for treatment of the data signal generated by the position primary element, which provides a synchronization signal, a speed of rotation signal, and a third (HCA) signal having a frequency which is the product of the speed or rotation of the engine by the associated number of protrusions on the periphery of the target;
    an electronic ignition advance calculator having a first output which provides a gross numerical value for ignition advance angle and a second output which provides a gross numerical value for the angle of conduction of the coil;
    a power stage for commanding said ignition coil;
    a command signal generator stage connected to the two outputs of the electronic advance calculator and the power stage commanding the ignition coil, said command signal generator stage comprising,
    a first counter, a second counter, and means for treating the initial conduction angle of the coil and the ignition advance angle based on the three signals provided by said stage for treatment of the primary element data signal,
    said first counter and said second counter having respective inputs connected to the output of the ignition advance calculator providing the gross numerical value for the ignition advance angle,
    said first counter having a clock input connected to the stage for treatment of the data signal generated by the position primary element thereby to receive therefrom the third (HCA) signal and output bits ranging from a most significant output bit to a least significant output bit,
    said second counter having a clock input connected to the stage for treatment of the signal retrieved by the position primary element so as to receive therefrom the speed of rotation signal, and
    an adding stage connected by a first series of inputs to selected of the output bits of said first counter and by a second series of inputs to the output of said ignition advance calculator for providing a gross numerical value for the conduction angle.

2. A spark coil control device according to claim 1, comprising:
    means for inhibiting counting by said second counter until said first counter reaches a predetermined saturation value.

3. A spark coil control device according to claim 1, wherein the command signal generator stage comprises:
    a first logic AND gate having three inputs including a first input connected to an output of said adding stage and a second input connected to the most significant output bit of said first counter, and having an output connected to an input of said power stage,
    a logic NAND gate having an output and plural inputs consisting of selected outputs of said first counter,
    a second logic AND gate having an output and plural inputs consisting of selected outputs of said second counter,
    a logic NOR gate having as inputs a first input connected to the output of said second logic AND gate and a second input connected to the output of said logic NAND gate, and
    a logic OR gate having an output connected to the third input of said first logic AND gate and a pair of inputs respectively connected to the outputs of said logic NOR gate and said logic NAND gate.

4. A spark coil control device according to claim 3, wherein the command signal generator stage further comprises:
    a third logic AND gate having an output connected as a clock input to said first counter and a pair of inputs respectively connected to the output of said logic NAND gate and said third (HCA) signal.

5. A spark coil control device according to claim 3, wherein the command signal generator stage further comprises:
    a fourth logic AND gate having an output connected as a clock input to said second counter, and a pair of inputs respectively connected to the output of said logic NOR gate and said speed of rotation signal from said treatment stage.

* * * * *